United States Patent [19]
Hickman

[11] 3,821,089
[45] June 28, 1974

[54] DISTILLATION OF SALINE WATER BY DIRECT CONTACT HEAT EXCHANGE WITH IMMISCIBLE LIQUID

[75] Inventor: Kenneth C. D. Hickman, Rochester, N.Y.

[73] Assignee: The United States of America as represented by the Secretary of the Interior, Washington, D.C.

[22] Filed: Nov. 23, 1971

[21] Appl. No.: 201,395

[52] U.S. Cl............... 203/10, 203/100, 202/185, 202/234
[51] Int. Cl............................................. C02b 1/06
[58] Field of Search.................. 202/185 A, 234; 159/DIG. 17; 203/10, 100, 56, 59, 60, 61, 63, 15; 252/312; 208/188

[56] References Cited
UNITED STATES PATENTS

| 3,232,847 | 2/1966 | Hoff | 203/11 |
| 3,236,747 | 2/1966 | Margiloff | 203/11 |
| 3,239,459 | 3/1966 | Patterson | 159/DIG. 17 |
| 3,312,602 | 4/1967 | Mattox et al. | 203/60 |
| 3,394,055 | 7/1968 | Ludwig | 203/100 |
| 3,438,870 | 4/1969 | Roscher et al. | 203/60 |
| 3,441,484 | 4/1969 | Teaney | 203/60 |
| 3,446,711 | 5/1969 | Rosenstein et al. | 203/10 |
| 3,483,093 | 12/1969 | Walker et al. | 203/100 |
| 3,498,886 | 3/1970 | Walker et al. | 203/100 |
| 3,681,202 | 8/1972 | Funkhouser | 203/60 |
| 3,692,634 | 9/1972 | Othmer | 203/100 |
| 3,734,160 | 5/1973 | Osdor | 203/10 |

Primary Examiner—Norman Yudkoff
Attorney, Agent, or Firm—Watson T. Scott; Frank A. Lukasik

[57] ABSTRACT

Steam is directly condensed with a cool immiscible oil in admixture with an ambiphyllic agent.

7 Claims, 2 Drawing Figures

DISTILLATION OF SALINE WATER BY DIRECT CONTACT HEAT EXCHANGE WITH IMMISCIBLE LIQUID

This invention relates to distillation of impure water such as sea water by direct contact heat exchange with an immiscible liquid.

To overcome the formation of scale on heat transfer surfaces during saline water distillation, it has been proposed to employ an immiscible heat transfer liquid in the system wherein steam is generated from the saline feed water by directly contacting it with a hot liquid usually referred to as a hot immiscible oil. During this heat exchange, the oil is cooled. After separation from the residual feed water, the cooled oil is brought into direct contact with the generated steam to condense the steam and simultaneously heat the oil again in preparation for the next distillation cycle.

Due to the oil's chemical unlikeness to water as evidenced by its immiscibility with water, it has previously been found that the oil does not readily condense the steam. As a result, the cooled oil is usually employed to chill distilled water which water is then employed to directly contact and condense the steam. This of course requires additional vessels, conduits, pumps, oil inventory, etc.

We have now discovered that the addition of very small amounts of certain ambiphyllic agents to the oil enables the oil to effectively directly condense steam. The process of my invention is basically illustrated in FIG. 2.

As used throughout the specification and claims, the phrase "ambiphyllic agent" refers to that class of compounds having two functional groups, one conferring an affinity and solubility in a hydrophobic liquid, and the other having affinity for a hydrophyllic liquid.

The type of ambiphyllic agent or additive employed in the present invention has a major solubility in the immiscible oil while presenting a functional group having a strong affinity to water. Such agents are the aliphatic alcohols over a large range of molecular weights. Other agents but of lesser utility are the long chain aliphatic acids and amines, suitability being impaired to various extents by corrosiveness or toxicity. Esters, which may be wholly aliphatic or compounds formed from the reaction of aliphatic acids or bases with aromatic bases or acids, are effective additives, their usefulness being limited by their tendency to hydrolize in the hotter stages of distillation. In all categories I exclude those members which by reason of low molecular weight or imbalance of functional groups or for other reasons are more soluble in water than in the heat exchange oil.

Exemplary members of the class of alcohols are 2-ethyl hexanol used to sensitize, for example, kerosene, and dodecanol added to diesel type oil; n-butanol added to dodecane is effective. Even methanol added to kerosene forms an excellent condensing medium for steam, but the methanol is removed in the resulting distillate and is thus not considered a practical embodiment of the present invention.

It is therefore an object of the present invention to improve the properties of immiscible oils in direct contact distillation processes.

Another object is to directly condense steam on a cooled immiscible oil.

A still further object is to maximize the heat transfer between steam and a cooled immiscible oil.

Other objects and advantages will be obvious from the following more detailed description of the invention.

In the practice of the present invention, the ambiphyllic agent can be combined with the oil in a plurality of manners. Preferably it is premixed with the oil. However, it can be incorporated into the process by injecting it as a vapor into the steam prior to or during contact of the steam with the chilled immiscible oil. This latter technique of course requires that the agent be readily vaporizable such as low boiling alcohols having the requisite solubility properties (e.g., ethylhexanol).

One mode of vapor injection involves incorporating the agent in concentrated amounts within the steam for a limited time until the desired amount becomes dissolved in the cool oil during steam-oil contact.

The agent can be incorporated in amounts of about 0.1 to 10.0 weight percent of the total oil-agent composition. Generally, however, the ratio is about 0.5 to 2.5 percent, preferably 0.75 to 1.5 percent.

As to the manner in which the oil is brought into intimate contact with the steam or with the saline feed water stream, prior art liquid-liquid and liquid-gas contacting expedients are suitable, such as spraying the cool oil into the steam or bubbling the hot oil through a body of saline water. Additionally, the oil-to-steam weight ratio, which is dependent upon the operating temperature differential between the immiscible oil and steam, is the same as that heretofore employed in the art, and generally ranges from an oil:steam weight ratio of about 10:1 to 20:1.

The immiscible oils employed in the process are typified by those cited by T. Woodward in his comprehensive discussion of the vapor reheat process in "Principles of Desalination," by K. S. Spiegler, Academic Press, 1966, chapter 4, pp. 117–150; and the oils are those liquids heretofore employed in the prior art which includes many of the "mineral oil" liquids as this phrase is defined in class 208 of the U.S. patent classification system. Petroleum distillates whose boiling point at atmospheric pressure ranges from about 300° to 500° F and light lubricating and machine oils are particularly suitable. Those chlorinated hydrocarbons previously employed in the art as immiscible oils are also suitable provided, of course, that these compositions meet odor, taste and toxicity standards. Chlorinated hydrocarbons are not preferred examples because their toxicity is now recognized to be highly objectionable. Typical preferable immiscible oils include kerosene, n-dodecane, diesel fuel oil and liquid petroleum.

The following is an exemplary list of suitable ambiphyllic agents:
  1-dodecanol
  n-butanol [1]
  t-butanol
  1-decanol
  2-ethyl-1-hexanol
  1-hexanol
  n-propanol [1]
  n-pentanol [1]
  nonyl amine
  cetyl amine pentyl acetate
acetic acid
propionic acid

[1] Readily vaporizable agents that can be introduced in vapor phase.

The following example illustrates the effectiveness of employing 1-hexanol with kerosene.

Example

Figure 1:
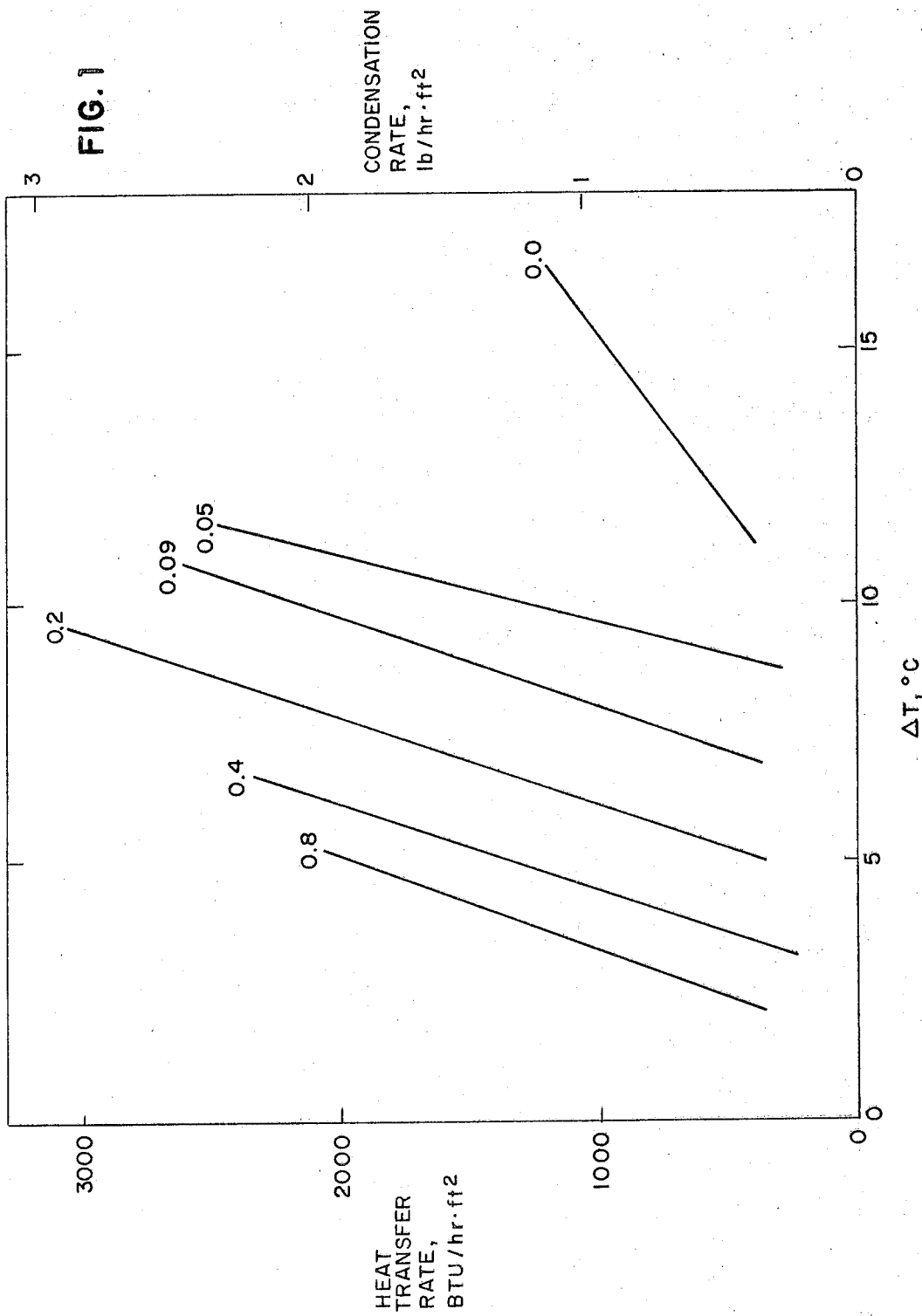
FIG. 1 shows a relationship between heat transfer rate or condensation rate with change in temperature.
Figure 2:
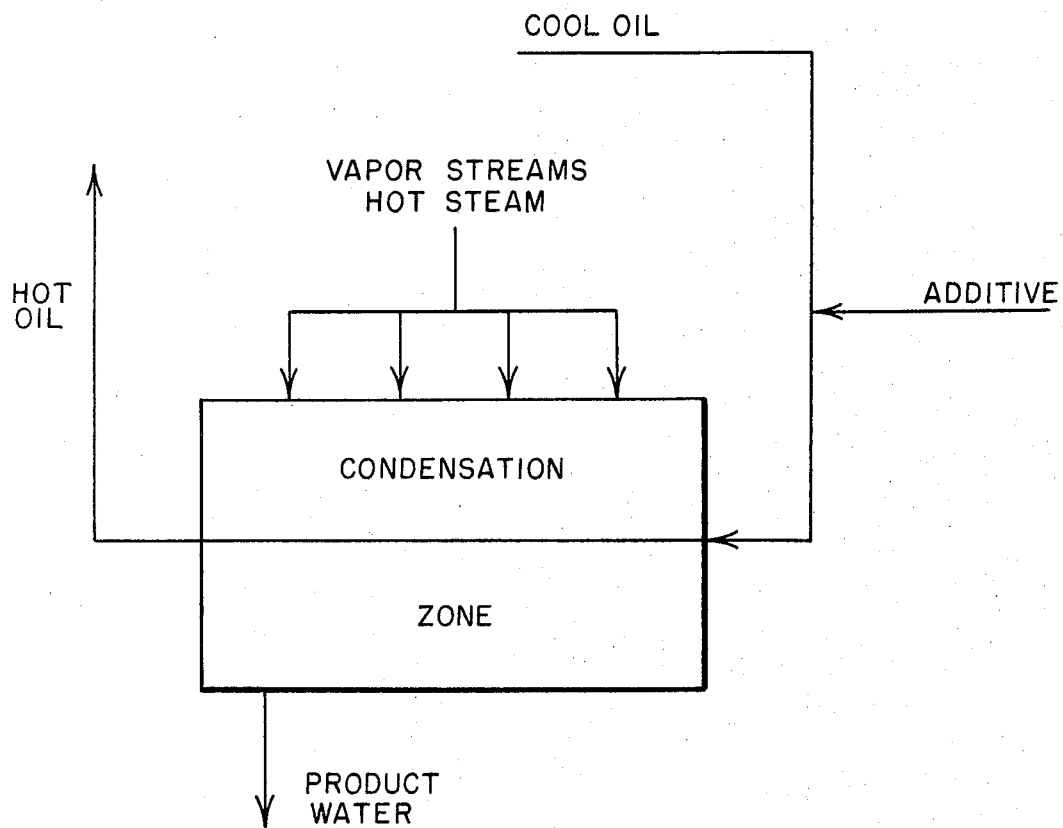
FIG. 2 show a block diagram of the process.

Several tests were performed in which steam was injected into a condensation chamber having a stream of cooled kerosene (plus 1-hexanol) flowing along the bottom of the chamber. In each tests the following conditions were measured: (1) the saturation temperature of the steam in the chamber; (2) the average temperature of the kerosene in the chamber; (3) the rate of heat transfer to the kerosene in Btu/hr/sq. feet of surface area of the stream of kerosene in the chamber; and (4) the steam condensation rate in lb/hr/sq. feet. Several ratios of hexanol-to-kerosene were tested including kerosene per se. The results are shown in the FIG. 1. The reference numerals adjacent each graph line represent the weight percent of 1-hexanol in the kerosene-hexanol mixture, and $\Delta t$ designates the difference in temperature between the steam saturation temperature and oil.

As can be seen from the graph the heat exchange capacity of the kerosene is markedly increased by the presence of the ambiphyllic agent.

In addition to its improved heat transfer properties, the oil-agent heat transfer medium of the present invention has less tendency to become dispersed in water (and thereby create emulsification problems) in comparison to prior art immiscible oils. That is, small amounts of prior art oils have tended to remain dispersed in the water after oil-water contact and separation, resulting in a distillate or concentrated brine product which is liable to emulsify, gather sludge and foam.

I claim:

1. In a process for condensing hot steam in a condensation zone consisting essentially of conveying said steam to said zone, conveying a cool oil to said zone to directly contact said steam in said zone, said oil being immiscible in water, the improvement comprising contacting said steam in said zone with a mixture of said oil and an ambiphyllic agent which is soluble in said oil and water but which is more soluble in said oil, said agent selected from the group consisting of 1-dodecanol, n-butanol, 1-decanol, 2-ethyl-1-hexanol, 1-hexanol, n-propanol, nonyl amine, cetyl amine, and mixtures thereof; wherein said agent is present in an amount of about 0.1 to 10 weight percent of said oil-agent mixture.

2. The process of claim 1 wherein said weight percent is about 0.5 to 2.5.

3. The process of claim 2 wherein said weight percent is about 0.75 to 1.5.

4. The process of claim 3 in which said steam in said condensation step is generated by directly contacting saline water with a heated body of said mixture of oil and agent.

5. The process of claim 4 wherein said oil is a petroleum distillate whose boiling point at atmospheric pressure ranges from about 300° to 500° F.

6. The process of claim 1 wherein said ambiphyllic agent is readily vaporizable and is mixed with said oil by injecting said agent as a vapor into said steam, and contacting said oil with said steam and vaporized agent.

7. The process of claim 1 wherein said ambiphyllic agent is introduced into said condensing step by mixing said agent as a liquid with said oil prior to said condensation step.

* * * * *